Aug. 23, 1938.  R. A. CHRISTIAN  2,127,673
CALCULATING MACHINE
Filed March 16, 1934  3 Sheets—Sheet 1

FIG. 1

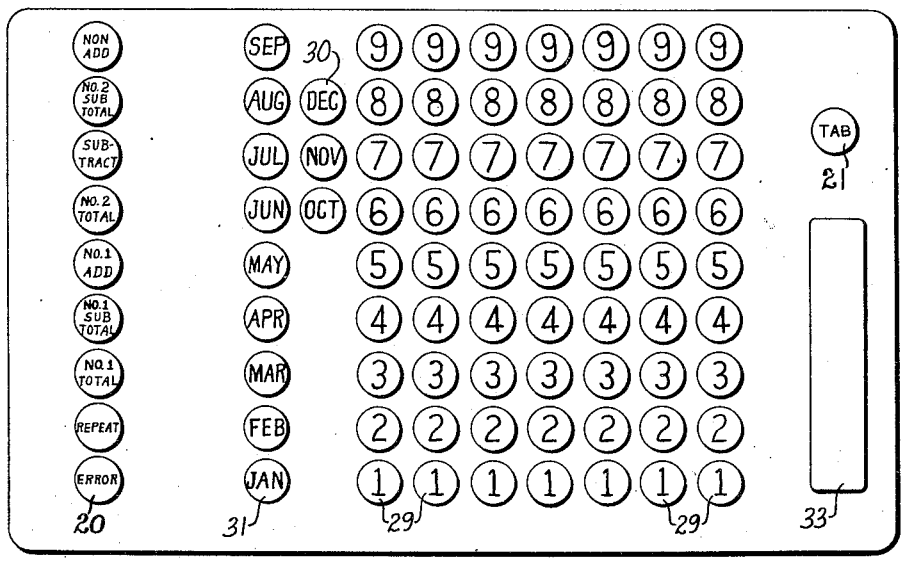

FIG. 2

| MONTH DUE | | PAYMENT | DATE PAID | BALANCE | |
|---|---|---|---|---|---|
| TOTAL AMOUNT | | 2,450.00 | | 15.00 | INS. |
| DOWN PAYMENT | | 500.00 | | 35.00 | CARRYING CHARGE |
| DIFF. | | 1,950.00 | | 2,000.00 | AMT. OF NOTE |
| | | | | 2,000.00 | |
| APR. | 1 | 200.00 | | 1,800.00 | |
| MAY | 2 | 200.00 | | 1,600.00 | |
| JUN. | 3 | 200.00 | | 1,400.00 | |
| JUL. | 4 | 200.00 | | 1,200.00 | |
| AUG. | 5 | 200.00 | | 1,000.00 | |
| SEP. | 6 | 200.00 | | 800.00 | |
| OCT. | 7 | 200.00 | | 600.00 | |
| NOV. | 8 | 200.00 | | 400.00 | |
| DEC. | 9 | 200.00 | | 200.00 | |
| JAN. | 10 | 200.00 | | 0.00 | |
| | 11 | | | | |
| | 12 | | | | |
| | 13 | | | | |
| | 14 | | | | |
| | 15 | | | | |
| | 16 | | | | |
| | 17 | | | | |
| | 18 | | | | |

FIG. 3

| MONTH DUE | | PAYMENT | DATE PAID | BALANCE | |
|---|---|---|---|---|---|
| TOTAL AMOUNT | | 2,450.00 | | 15.00 | INS. |
| DOWN PAYMENT | | 500.00 | | 35.00 | CARRYING CHARGE |
| DIFF. | | 1,950.00 | | 2,000.00 | AMT. OF NOTE |
| | | | | 2,000.00 | |
| APR. | 1 | 170.00 | | 1,830.00 | |
| MAY | 2 | 170.00 | | 1,660.00 | |
| JUN. | 3 | 170.00 | | 1,490.00 | |
| JUL. | 4 | 170.00 | | 1,320.00 | |
| AUG. | 5 | 170.00 | | 1,150.00 | |
| SEP. | 6 | 170.00 | | 980.00 | |
| OCT. | 7 | 170.00 | | 810.00 | |
| NOV. | 8 | 170.00 | | 640.00 | |
| DEC. | 9 | 170.00 | | 470.00 | |
| JAN. | 10 | 170.00 | | 300.00 | |
| FEB. | 11 | 170.00 | | 130.00 | |
| MAR. | 12 | 130.00 | | 0.00 | |
| | 13 | | | | |
| | 14 | | | | |
| | 15 | | | | |
| | 16 | | | | |
| | 17 | | | | |
| | 18 | | | | |

Inventor
Raymond A. Christian
By  *Earl Beust*
His Attorney

Aug. 23, 1938.  R. A. CHRISTIAN  2,127,673
CALCULATING MACHINE
Filed March 16, 1934  3 Sheets-Sheet 2

Inventor
Raymond A. Christian
By
Carl Beust
His Attorney

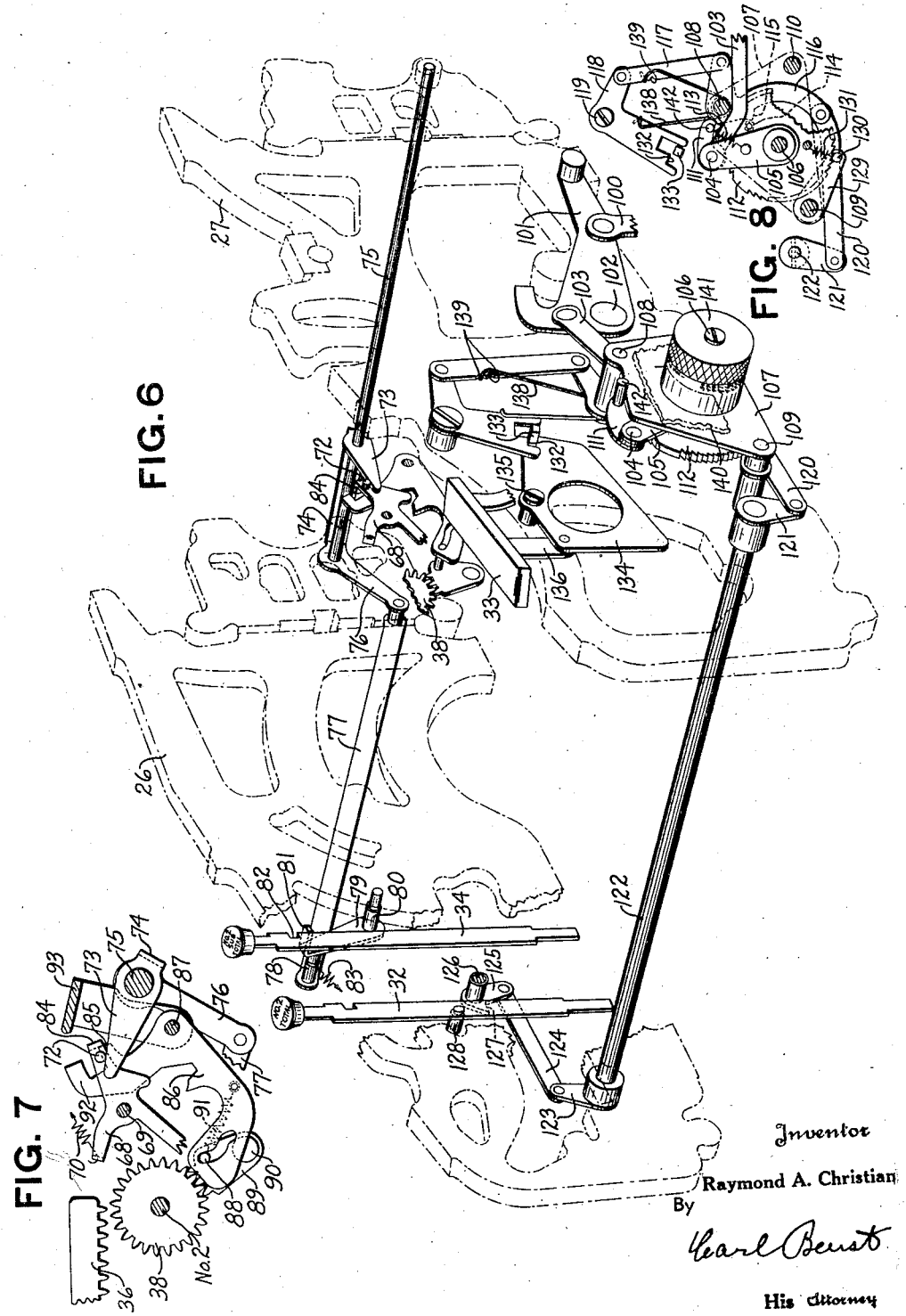

Patented Aug. 23, 1938

2,127,673

UNITED STATES PATENT OFFICE 2,127,673

CALCULATING MACHINE

Raymond A. Christian, Dayton, Ohio, assignor to The National Cash Register Company, Dayton, Ohio, a corporation of Maryland Application March 16, 1934, Serial No. 715,801

4 Claims. (Cl. 235—60)

This invention relates to improvements in calculating machines of the type set forth in Letters Patent of the United States Nos. 1,197,276 and 1,197,278 issued September 5, 1916, to Halcolm Ellis, Patent No. 1,203,863 issued November 7, 1916, also to Halcolm Ellis, and Patent No. 1,819,084 issued August 18, 1931, to Emil John Ens.

In business establishments where merchandise is sold on the deferred payment or installment plan it is quite often the practice to prepare a schedule of periodical payments for each purchaser at the time or soon after the sales agreement is consummated. Generally such a schedule shows the cost of the article plus any carrying charges, such as insurance, interest and bookkeeping costs, the amount of the down payment, if any, and the unpaid balance which is to be divided into monthly payments extending over a period of time determined by the amount the purchaser agrees to pay each month. Opposite each monthly payment a new balance is printed showing the amount owed by the purchaser after each payment is made.

It is not feasible to use completely printed forms for this purpose as these schedules must be varied to meet the requirements of businesses handling a variety of merchandise; for example, an automobile dealer handling cars in different price classes, or a merchant who handles radios, washing machines, vacuum cleaners and other electrical goods. It is also necessary to vary the schedules to meet the requirements of the purchaser who contracts to pay a certain amount each month. Then too, in this connection it is necessary to consider the fact that purchases take place in every month of the year, another reason why it is necessary to be able to vary the schedule.

From the above it will be seen that it is more feasible to have partially printed forms and to complete such forms at the time the sales contract is entered into by filling in the amounts and dates with an accounting machine such as is disclosed in the patents referred to at the beginning of this specification.

In order to facilitate the filling in of these schedules or ledger sheets it is desirable to advance the date printing mechanism automatically. Therefore, it is broadly an object of this invention to provide an accounting machine with automatic date advancing mechanism.

A more specific object is to supply means whereby conditioning the machine for a certain type of operation causes the date type carrier to be automatically advanced.

Another object is to provide means to automatically lock the machine against operation upon completion of a predetermined number of operations.

A further object is to furnish means to disable the automatic machine locking mechanism when the machine is conditioned for another type of operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a diagrammatic view of the keyboard of the machine of the instant invention.

Figs. 2 and 3 are facsimilies, in reduced scale, of schedule or ledger cards used in the machine of the instant invention.

Fig. 6 is a perspective view showing in particular the automatic date advancing mechanism and the automatic operation controlling mechanism.

Fig. 7 is a detail view of the date controlling wheel and its automatic advancing mechanism.

Fig. 8 is a side elevation of a portion of the mechanism that locks the machine releasing mechanism against operation after a predetermined number of machine operations have been completed.

GENERAL DESCRIPTION

Figure 9:
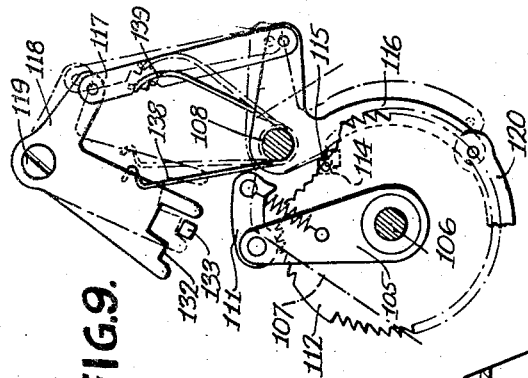
Fig. 9 is a side elevation of the mechanism shown in Fig. 8, showing the position of the parts before and after the last step of movement of the ratchet.

The mechanism of the instant invention is incorporated in the well known Ellis type of accounting machine which is fully illustrated and described in the patents referred to at the beginning of this specification.

A part of the instant invention consists of mechanism to automatically advance the month type carrier one step each time a certain key is depressed. Located on the left of the machine keyboard are two rows of month keys similar in every respect to the regular amount keys. These keys control a reciprocating actuator rack similar to the regular amount actuators, and the actuator rack in turn cooperates with a month wheel mounted on the No. 2 totalizer line but otherwise independent of said totalizer line. The month actuator rack is connected in the usual way to the month type carrier or segment and controls the positioning of said type segment in the well known manner.

The month actuator control wheel, being mounted on the No. 2 totalizer shaft, naturally moves in unison therewith. Consequently it is engaged with and disengaged from its actuator rack in accordance with the operation being performed in the No. 2 totalizer. Transfer mechanism, independent of the No. 2 totalizer cooperates with the month control wheel to locate said wheel in its zero position and to advance the month wheel each time a sub-total is printed from the No. 2 totalizer. In the final operation of a series of operations the No. 2 totalizer and the month control wheel are reset to zero. Consequently the month control wheel is invariably standing at zero at the beginning of a new series of operations.

In preparing a new schedule the first monthly payment is invariably added into the previously cleared No. 2 totalizer. In this No. 2 adding operation, depressing the desired month key causes the month actuator rack and the actuator control wheel to be positioned commensurate with said month key. In succeeding operations sub-totals are printed from the No. 2 totalizer and in such operations the month actuator rack is not positioned by the month key but is positioned by means of the month control wheel which is stopped in its zero position by the transfer mechanism in the usual manner. Depressing the No. 2 subtotal key the first time in a series of operations causes the transfer mechanism for the month control wheel to be tripped and this in turn advances the month control wheel one step. The month control wheel then positions the month actuator rack and its printing segment to print the following or succeeding month. In a given series of operations, all but the first and last operations, which involve the No. 2 totalizer, are reading or sub-total takings. As the pressing of the sub-total key causes the transfer mechanism for the month control wheel to be tripped, and as the sub-total key is not restored until after the printing, it results that when the transfer pawl restoring mechanism functions, the transfer pawl will not be latched in the potentially effective position, but will act immediately to again advance the month control wheel. This is due to the sub-total key being held in depressed position until near the end of the machine operation. Therefore, at the end of any sub-total operation, the transfer pawl will be inoperative to advance the month control wheel by mere depression of the sub-total key.

From the foregoing description it will be seen that the initial adding operation in the No. 2 totalizer, by means of the month keys, positions the month control wheel to the desired month and that in the first succeeding sub-total operation, depressing the No. 2 sub-total key advances the month wheel to cause the following month to be printed. Thereafter in the series of sub-total operations, involving the No. 2 totalizer, it is not the initial depression of the No. 2 sub-total key but its retention in the depressed condition, until after the transfer pawl restoring bar has gone through the restoring motion, that causes the month control wheel to be advanced, ready for printing the proper month on the next machine operation involving that totalizer.

Included in the instant invention is mechanism to lock the machine against operation after a predetermined number of operations have been performed. This mechanism may be conveniently set to any desired number of operations from 1 to 50 and after the machine has performed the desired number of operations, the starting bar is automatically locked against depression. This notifies the operator that the desired number of operations have been completed and enforces a total printing operation in which depression of the No. 2 total key unlocks the starting bar so that the machine may be further operated.

The mechanism briefly outlined above will now be described in detail.

Detailed Description

Machine keyboard and operating mechanism

Figure 4:
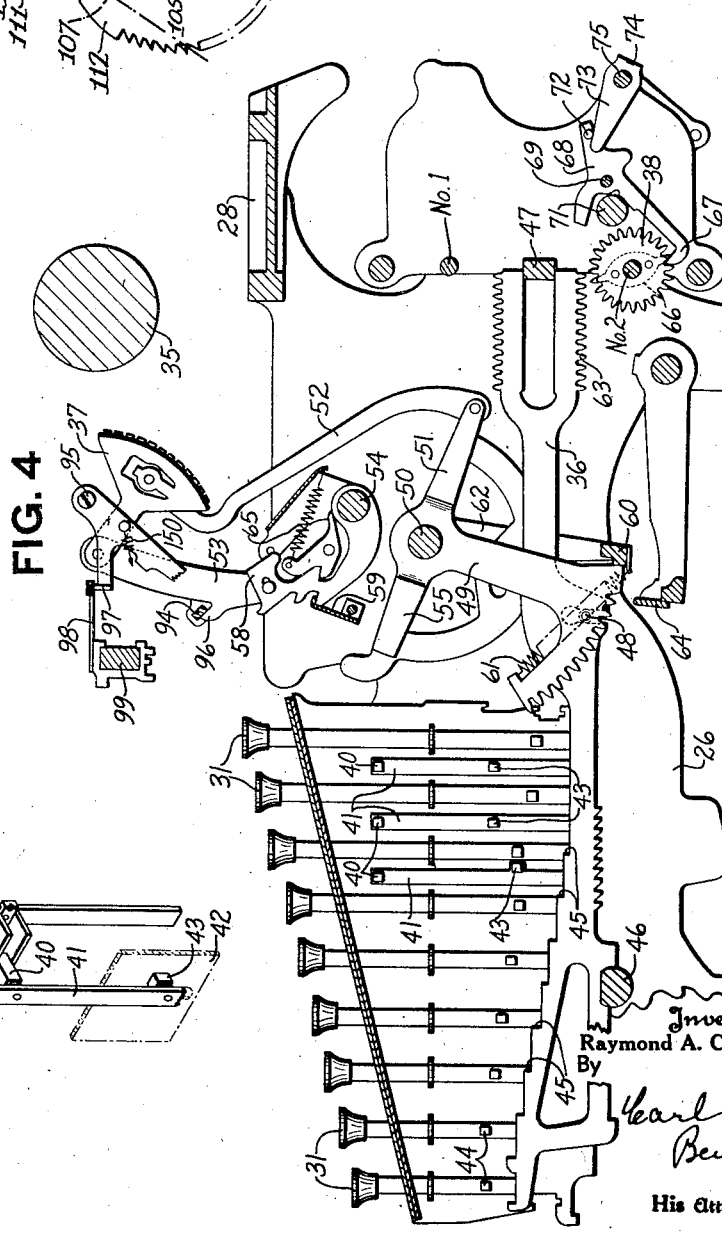
Fig. 4 is a sectional view of the machine taken just to the right of the date key bank.

It will be recalled that the instant invention is embodied in the well known Ellis type accounting machine, the mechanism of which is supported by main frames 26 and 27 (Fig. 6) in turn supported by a base plate (not shown) and various cross frames one of which, 28, is shown in Fig. 4.

In the figure showing the frame work in phantom by dot and dash lines, where the dot and dash lines do not show behind the parts it indicates that such parts are in front of the frames, but where the dot and dash lines are shown crossing the full line parts it indicates that such parts are behind the frames.

A typical keyboard arrangement of such a machine is shown in diagrammatic form in Fig. 1. This machine has a plurality of rows of amount keys 29, two rows of month keys 30 and 31, and a row of control keys 20. The machine is operated by the usual type electric motor which is clutched to the machine operating mechanism by the depression of a starting bar 33. The machine of the instant invention is also equipped with a traveling carriage which is generally automatically tabulated from one column to the other but may be manually tabulated by means of a tabulating key 21 located just above the starting bar 33.

In its present embodiment, the machine is equipped with two registers or totalizers arranged in vertical alinement at the rear of the machine. The upper or No. 1 (Fig. 4) totalizer is an add-subtract or balance totalizer and the lower or No. 2 totalizer is a straight adding totalizer. However, it is not intended to limit this invention to a machine having only two totalizers, as a machine having additional totalizers may be used if desired. The wheels of the totalizers are actuated by reciprocating actuator racks under control of the amount keys in adding and subtracting operations and the actuators in turn position type carriers or printing segments adapted to impress amounts on material wound around a platen roll 35 (Fig. 4) supported by the traveling carriage. In total printing operations the actuator racks and amount type carriers are positioned by the totalizer wheels as said wheels are returned to zero.

It will be noted that the amount actuator racks and their associated printing segments for the totalizers are not here shown. However, a month actuator rack 36 and its printing segment 37 are similar to the regular totalizer actuators and their corresponding printing segments. The month actuator rack 36 cooperates only with a month wheel 38 and has no connection whatever with the wheels of the No. 1 and No. 2 totalizers. The wheels of the No. 2 totalizer are not here shown, but the month wheel 38 (Fig. 4) is loosely mounted on the No. 2 totalizer shaft and moves into engagement with and is disengaged from its actuator rack 36 at exactly the same time as the wheels of the No. 2 totalizer are engaged with and disengaged from the regular actuators. For example, if an adding operation is being performed in the No. 2 totalizer, the month wheel 38 is engaged with and disengaged from its actuator rack 36 in adding time, and if a total printing operation is being performed in the No. 2 totalizer, the month wheel is engaged with and disengaged from its actuator 36 in proper timing according to whether a total or a sub-total is being printed.

Automatic month advancing mechanism

Figure 5:
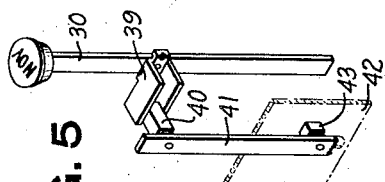
Fig. 5 is a detail view of one of the date keys.

By referring to Figs. 1 and 4, it will be observed that there are two rows of month keys 30 and 31, nine of which are in one row and three in the other row. Each of the three keys 30 has secured thereto a U-shaped bracket 39 (Fig. 5) which embraces a square stud 40 in an auxiliary key stem 41 located in a plane with the stems of the keys 31 and mounted for vertical sliding movement on a keyboard plate 42 by means of a stud 43 and the stud 40, both of said studs extending through vertical slots in said plate 42. Each of the keys 31 has secured in its stem a square stud 44 which, together with the studs 43 in the stems 41 for the October and November keys, are adapted to cooperate with graduated steps 45 on the month actuator rack 36.

The rack 36 is mounted for horizontal reciprocating movement on a rod 46 and a bar 47, both of which are supported by the frames 26 and 27 (Fig. 6). The rack 36 has a vertical slot which straddles a stud 48 (Fig. 4) carried by a segment 49 loosely mounted on a leading frame shaft 50 journaled in the frames 26 and 27. The segment 49 has an arm 51 pivotally connected by a link 52 to the month printing segment 37 which is pivotally supported by an arm 53 loose on a printer shaft 54, journaled in the main frame 27 and the printer end plates (not shown). Connected to the arm 53 is an anti-rebound plate 58 with a projection arranged to cooperate with a release trigger 5 turnably mounted in the printer frame.

The segment 49 is normally maintained in contact with the cross bar of a leading frame 60 by means of a spring 61 tensioned between said cross bar and said segment 49. The arms 62 of the leading frame 60, only one here shown, are secured to the shaft 50.

The rack 36 is normally maintained in zero position by a zero stop pawl (not shown) which is moved to ineffective position by depression of one of the keys 30 or 31 with the exception of the December key.

The stud 43 in the stem 41 for the December key 30 (Figs. 1 and 4) does not cooperate with one of the graduated steps 45 on the rack 36. This key is merely a release key for other depressed month keys and unlike said other month keys does not release the zero stop pawl for the month rack 36. Thus it is evident that the home or zero position of the rack 36 and the segment 37 is the proper position for printing the month of December.

As it is necessary to print in zero position, the regular zero elimination pawl has been omitted and the month printing segment 37 is controlled by a bail 94 of a non-print yoke pivoted at 95 to the printer frame, in cooperation with a projection 96 of the arm 53. The non-print yoke has an extension 97 normally maintained in the path of an extension of a control element 98 by a spring 150, said control element 98 being adjustably mounted in predetermined columnar positions on a bar 99 connected to the front of the traveling carriage.

From the above description it is obvious that when the traveling carriage is so positioned that one of the control elements 98 engages the extension 97 of the non-print yoke the bail 94 is moved into the path of the projection 96 thereby blocking printing movement of the arm 53 and the month segment 37.

During each operation of the machine, the shaft 50 and the leading frame 60 are oscillated first in a counterclockwise direction and then back to normal position as shown in Fig. 4. The rack 36 has a plurality of teeth 63 which cooperate with the teeth of the month wheel 38.

As previously brought out, when a schedule for a new account is made out on a ledger card the month in which the first payment is to be made is printed on the ledger card by depressing the proper key 30 or 31. Depression of a month key other than the December key disengages the zero stop pawl from the rack 36, consequently upon release of the machine for operation, the segment 49 and the rack 36 are yieldingly urged by the spring 61 to follow the leading frame 60 in its initial movement counterclockwise. The segment and the rack move in unison with the leading frame 60 until one of the steps 45 on said rack engages the stud 43 or 44 of the depressed month key. This prevents further movement of the rack 36 and associated mechanism. However, the leading frame 60 completes its initial movement, stretching the spring 61. When the leading frame 60 reaches the terminus of its initial movement, a liner 64 is engaged with the teeth of the segment 49 and immediately thereafter the trigger 59 is rocked counterclockwise to release the arm 53 to the action of a spring 65, which rocks the printing segment 37 into contact with the ledger card to print the first month thereon.

It will be recalled that the first monthly payment is added into the No. 2 totalizer and that the month wheel 38 is always in home or zero position at the beginning of this operation. When the leading frame 60 reaches the end of its initial movement, the month wheel 38 is rocked into engagement with the teeth of the rack 36. After the impression is made, the aliner 64 is disengaged from the segment 49 and the leading frame 60 starts its return movement clockwise to pick up the segment 49 and return it and the rack 36 to their home positions. Return movement of the rack 36 rotates the month wheel 38 commensurate with the depressed month key.

The month wheel 38 differs from the regular amount totalizer wheels in that it has 24 teeth instead of 20. This provides two divisions or 12 teeth each to take care of the 12 months in a year.

The month wheel 38 (Fig. 4) has secured thereto a plate 66 having diametrically opposed teeth which cooperate with a projection 67 of a trip pawl 68 rotatably supported by a shaft 69 supported in the rockable No. 2 totalizer frame. A spring 70 (Fig. 7) is tensioned to urge the trip pawl 68 clockwise into engagement with a shaft 71 (Fig. 4) supported by the No. 2 totalizer frame. The pawl 68 (Figs. 4 and 7) carries a stud 72 adapted to cooperate with an arm 73 of a yoke 74 loosely supported by a shaft 75, the opposite ends of which are supported by extensions of the main frames 26 and 27. The yoke 74 (Fig. 6) has another arm 76 pivotally connected by a link 77 to a stud 78 secured in an arm 79 turnably mounted on a stud 80 secured in the left frame 26. The arm 79 has a right-angled extension 81 adapted to cooperate with a notch 82 in the No. 2 sub-total key 34. A spring 83 is tensioned to urge the arm 79 counterclockwise, as observed in Fig. 6.

Directing attention to Figs. 6 and 7, the pawl 68 has an extension 84 which cooperates with a projection 85 of an arm 86 loosely mounted on a shaft 87 supported by the extensions of the frames 26 and 27. The arm 86 has therein a cam slot through which extends a stud 88 in a month wheel advancing segment 89 pivoted on a stud 90 in a stationary plate of the No. 2 totalizer. A spring 91 (Fig. 7) is tensioned to urge the arm 86 in a clockwise direction.

As explained above, in preparing a new ledger card, the first month in which a payment is to be made is selected by depressing the proper month key. This also positions the month control wheel 38. In the succeeding operation, depressing the No. 2 sub-total key 34 (Fig. 6) advances the month control wheel 38 one step, and as this is a reading or sub-total printing operation in the No. 2 totalizer, the wheel 38 positions the month accumulator rack 36 (Fig. 4) and the printing segment 37 to print the succeeding month on the ledger card.

Depressing the No. 2 sub-total key 34 (Fig. 6) moves the notch 82 opposite the projection 81 of the arm 79. The spring 83 is then free to urge said arm 79 counterclockwise to retain said key 34 in depressed position. This counterclockwise movement of the arm 79 through the link 77 rocks the yoke 74 clockwise causing the arm 73 thereof, in cooperation with the stud 72 to rock the trip pawl 68 counterclockwise (see also Fig. 7). This moves the ear 84 out of engagement with the projection 85 on the arm 86. The spring 91 then rotates said arm 86 clockwise until a projection 92 thereof engages a restoring bar 93, which bar is the usual and well known transfer restoring bar shown and described in the above mentioned Ellis patent. This clockwise movement of the arm 86 by means of the cam slot therein cooperating with the stud 88 rotates the advancing segment 89 clockwise to advance the month control wheel 38 one step counterclockwise.

As this is a sub-total operation in the No. 2 totalizer the month wheel 38 is engaged with its actuator 36 and consequently disengaged from the segment 89 before the rack 36 has started its initial movement rearwardly. The pawl 68 (see also Fig. 4) moves with the totalizer frame, thereby retaining its relation to the wheel 38 and this also moves the stud 72 upwardly out of engagement with the arm 73 of the yoke 74. Immediately after this disengagement of the totalizer from the segment 89, and of the stud 72 from the arm 73, the restoring bar 93 makes its restoring movement counterclockwise to return the arm 86 to its untripped position, and the spring 70 restores the pawl 68 so that the ear 84 is moved into the path of the projection 85 to retain the arm 86 in its untripped position, as shown in Fig. 4. The restoring of the trip pawl 68 moves the projection 67 thereof into the path of the diametrically opposed teeth of the plate 66. As the totalizer line carrying the month wheel continues its movement away from the racks, the stud 72 again engages the then stationary arm 73, turning pawl 68 to ineffective position and allowing the restored transfer segment 89 to immediately advance the month wheel one step, ready for the next operation involving the No. 2 totalizer. The arm 73 remains in its effective position throughout the operation until the sub-total key is restored toward the last of the machine operation. Thereafter, in the same series of operations, whenever the sub-total key for the No. 2 totalizer is depressed, the arm 73 holds the pawl 78 in ineffective position so that the month wheel will advance immediately after the restoring bar 93 functions and moves away.

Initial movement rearwardly of the rack 36 (Fig. 4) rotates the wheel 38 clockwise until the proper tooth of the plate 66 engages the projection 67 of the trip pawl 68. This positions the month printing segment 37 to print the succeeding month on the ledger card, due to the fact that the wheel 38 was advanced one space at the close of the previous operation.

*Mechanism to predetermine the number of machine operations*

To repeat, at least in part, a statement previously made, the machine of the instant invention is provided with mechanism to lock the starting bar against depression after a predetermined number of operations have been completed. In using this mechanism the operator sets a dial to the desired number of operations and after this number of operations have been performed the machine starting bar is locked against depression. Before the machine can be further operated, it is necessary for the operator to depress the No. 2 total key which shifts the starting bar locking mechanism to ineffective position. Such mechanism is shown in Figs. 6 and 8 and will now be described.

A link 100 (Fig. 6) operatively connects an arm 101 to the driven member of the motor clutch (not shown). The arm 101 is secured on a main drive shaft 102 journaled in the frames 26 and 27 and is pivotally connected by a link 103 to a stud 104 (Fig. 8) in an arm 105 loose on a shaft 106 journaled in a plate 107 secured to the right machine frame 27 by studs 108, 109 and 110. Turnably mounted on the stud 104 is a ratchet pawl 111 urged clockwise into cooperation with the teeth of a ratchet 112 by a spring 113. The ratchet wheel 112 is secured to the lefthand end of the shaft 106 and carries a square stud 114 which coacts with a projection 115 on a lever 116 loose on the stud 108. In Fig. 8 the parts are shown in the position they assume when they are one step out of normal position. During this last step the stud 114 engages the projection 115 and shifts the locking plate 118 to effective position. At the end of this step of movement, when the ratchet is in normal position, stud 114 will have moved past the projection, so that in the restoring operation, the projection may be rocked over the top of the stud. Fig. 9 shows the parts in full lines in the positions they occupy before the last step, and the dot and dash lines show the parts in the positions to which they have been moved during the last step of movement into the normal position of the ratchet 112. A horizontal extension of the lever 116 is connected by a link 117 to a starting bar locking plate 118 pivoted on a stud 119 secured in the machine frame 27. The lower end of the lever 116 is loosely connected by a link 120 to an arm 121 secured on the righthand end of a shaft 122 the opposite ends of which are journaled in the frames 26 and 27.

Secured on the lefthand end of the shaft 122 is an arm 123 connected by a link 124 to a shifting plate 125 loose on a stud 126 secured in the left frame 26. The plate 125 has a projection 127 which cooperates with a stud 128 fast in the No. 2 total key 32. Rotatably supported by the stud 109 is a ratchet retaining arm 129 having therein a stud 130 maintained in engagement with the teeth of the ratchet 112 by a spring 131.

The locking plate 118 (Figs. 6 and 8) has an abrupt surface 132 arranged to move into the path of a square stud 133 secured in a machine releasing plate 134 rotatably supported by a stud 135 secured in the right frame 27. The lower end of a stem 136 of the starting bar 33 is pivoted to the plate 134. Supported by the stud 109 is a torsion spring 138 one extension of which engages the locking plate 118 and another extension thereof cooperates with two notches 139 in the link 117. Extending through an opening in a machine cover plate 140 is a knurled knob 141 secured on the righthand end of the shaft 106 and having engraved on the periphery thereof a plurality of numbers corresponding to the teeth of the ratchet 112. An index line on the plate 140 is used in conjunction with the numbers on the knob 141 for locating the ratchet 112 in the desired position.

A stud 142 (Figs. 6 and 8) cooperates with the top surface of the plate 107 to disengage the pawl 111 from the teeth of the ratchet 112 after said pawl has advanced the ratchet the equivalent of one tooth space. The top surface of the plate 107 in cooperation with the stud 142 also maintains the pawl 111 out of engagement with the teeth of the ratchet 112 when said pawl is in its home position, as here shown. This allows the operator to turn the knob 141 in either direction when setting the ratchet 112.

To predetermine the number of machine operations the operator sets the knob 141 to the desired number of operations and proceeds to operate the machine in the usual manner. The arm 101 by means of the link 103 rocks the arm 105 first counterclockwise and then back to normal position. This causes the ratchet pawl 111 to advance the ratchet 112 the equivalent of one tooth space each operation of the machine. The ratchet 112 in moving to its zero or neutral position causes the stud 114 to engage and wipe past the projection 115 to rock the lever 116 (Fig. 8) counterclockwise. This, by means of the link 117, rocks the plate 118 counterclockwise to move the abrupt surface 132 into the path of the stud 133 (see also Fig. 6) to block the counterclockwise releasing movement of the plate 134 thereby preventing depression of the starting bar 137. This upward movement of the link 117 shifts the lower notch 139 therein into engagement with the rearward extension of the spring 138 to retain the plate 118 in effective position after the stud 114 moves beyond the projection 115 of the lever 116. This locks the machine against further operation until a total printing operation is performed using the No. 2 totalizer. Depressing the No. 2 total key 32 (Fig. 6) causes the stud 128 to engage the projection 127 to rock the plate 125 counterclockwise. This, by means of the link 124, rocks the arm 123, the shaft 122 and the arm 121 in a clockwise direction, whereby the link 120 returns the lever 116 clockwise to restore the locking plate 118 clockwise to ineffective position in which position a clearance opening is provided for the stud 133. When the ratchet 112 is in its zero or neutral position, a blank portion of its periphery, in which there are no teeth, is opposite the tooth of the ratchet pawl 111. Consequently said pawl operates idly over this surface without imparting any movement to said ratchet 112. This also makes it possible to operate the machine when it is not desired to predetermine the number of operations.

Machine operation

While it is probable that an understanding of the operation of the machine of the instant invention has been obtained from the preceding description, still it is thought advantageous to give a brief description of operation in the following explanation.

In the system to be outlined, an automobile dealer has been chosen as an example. However, it is not the intention to limit the use of this machine to automobile agencies, as it may be used in any business where merchandise is sold on the deferred payment or installment plan.

In machines of this character, it is usually the practice to automatically select and condition the totalizers for addition and subtraction by means of control elements on the traveling carriage. These control elements are also used as stops to locate the different columns of the ledger card in proper relation to the printing segments. As an alternative, the control keys may be used instead of the control elements to select and condition the totalizers for addition and subtraction and in this outline of operation the latter method has been employed. This, however, is merely a matter of choice and the former method could just as easily have been used.

Fig. 2 shows the facsimile of a typical ledger card used by automobile dealers in handling the accounts of customers who purchase automobiles on the installment plan. As an example, let us assume that a customer purchases an automobile for $2450.00 upon which he makes a down payment of $500.00 and agrees to pay the balance at the rate of $200.00 per month. Immediately after the sale is consummated a ledger card is made out for the purchaser showing the amount of his purchase, the amount of his down payment, the amount of the insurance premium and the amount of carrying charges, which include interest and bookkeeping charges. After the down payment has been subtracted from the amount of the purchase and the insurance premium and the carrying charge added thereto the remaining sum is the amount that the purchaser agrees to pay in monthly installments of $200.00 each. In preparing such a ledger card, the following sequence of operations are performed:

First the operator sets the knob of the operation predetermining mechanism to the desired number of operations, in this case twenty-five. It will be noted that there are twenty-seven operations on the ledger card shown in Fig. 2, but the last two operations are not included in the number of predetermined operations. Next the ledger card is placed around the platen roll so that the impression will be made on the proper line, the traveling carriage is tabulated to the proper column and the amount of the purchase, in this case, $2450.00, is set up on the amount keys. The No. 1 add key is then depressed and the machine released for operation by depressing the starting bar 33. This operation of the machine causes the amount of the purchase to be added in the No. 1 or balance totalizer and simultaneously printed in the proper space on the ledger card. When the traveling carriage is in this columnar position one of the control elements 98 (Fig. 4) moves the non-print ball 94 into the path of the projection 96 to block printing movement of the arm 53 and segment 37.

Next the down payment of $500.00, is printed upon the ledger card and simultaneously subtracted from the $2450.00 in the balance totalizer. In the next operation a sub-total is printed from the No. 1 totalizer to show the amount of the balance, in this case $1,950.00, on the ledger card. The traveling carriage then tabulates to the "Balance" column where another one of the control elements 98 disables the month printing segment 37 and in the two succeeding operations, $15.00, the amount or premium on the insurance, and $35.00, the carrying charge, are added to this balance of $1,950.00. In another sub-total operation of the No. 1 totalizer the balance of $2000.00, or the amount of the note signed by the purchaser, is printed on the ledger card. The amount of the note, $2000.00, is again printed in the "Balance" column of the ledger card by a sub-total operation using the balance totalizer.

At the end of the above operation the traveling carriage is returned to the "Payment" column on the ledger sheet in which position the month printing segment 38 (Fig. 4) is free to print as there is no control element 98 in this position.

In the next operation, the operator depresses the key representing the month in which the first payment is to be made, in this case April, sets up the amount of the first monthly payment, $200.00, on the keyboard, depresses the subtract key and releases the machine for operation by depressing the starting bar 32. This causes the month and the amount of the payment to be printed on the ledger card and the amount of the payment, $200.00, is simultaneously subtracted from the balance of $2000.00 contained in the No. 1 totalizer and added in the previously cleared No. 2 totalizer. The machine is conditioned to add into the No. 2 totalizer, when in the payment column, by a control element on the carriage, similar to control element 98 (Fig. 4), contacting a hanging bar lever. When the sub-total key or the total key for the No. 2 totalizer is used, it supersedes the action of the adding control mechanism. For a more detailed description of this mechanism, reference is made to Letters Patent of the United States No. 1,197,276, above mentioned. The traveling carriage is then tabulated to the "Balance" column and in a sub-total operation of the No. 1 totalizer the balance of $1800.00 is printed on the ledger card.

In the succeeding operation for the month of May, the operator depresses the No. 2 sub-total key and the subtract key and releases the machine for operation in the usual manner. This causes the amount in the No. 2 totalizer, which it will be recalled in this case is $200.00, to be subtracted from the balance totalizer and simultaneously printed in the payment column on the ledger sheet. It will be recalled that depressing the No. 2 sub-total key causes the month control wheel to be advanced one step to automatically print the month of May simultaneously with the printing of the amount of the payment for that month. After the printing has taken place, the transfer pawl restoring mechanism turns the month control wheel to the June position, ready for the next operation. After this operation, the traveling carriage is again tabulated to the balance column and in a sub-total printing operation of the No. 1 totalizer the "Balance" of $1600.00 is printed on the ledger card.

As the restored transfer mechanism has immediately spent itself in advancing the month control wheel, there will be no advance of the month wheel when the No. 2 sub-total key is next depressed. The sub-total for the "June" operation having been printed, the restoring bar sets the month wheel to "July" position, ready for the next No. 2 sub-total operation. This setting of the month control wheel to position for the next operation will continue so long as the restoring bar functions while the No. 2 sub-total key is depressed. However, when the No. 1 totalizer is operated in a sub-total operation to print the balance ($200.00) for the month of December the machine is automatically locked against a further sub-total operation by the operation predetermining mechanism.

This notifies the operator that the schedule is about complete and enforces a total printing operation from the No. 2 totalizer. Depressing the No. 2 total key unlocks the machine starting bar as explained above and the No. 1 totalizer is conditioned for a subtract operation by depressing the subtract key, after which, operation of the machine causes the $200.00 to be cleared from the No. 2 totalizer and simultaneously subtracted from the balance of $200.00 in the No. 1 totalizer. A final clearing of the No. 1 totalizer proves the account by printing a single zero in the "Balance" column of the ledger card. The taking of a total from the No. 2 totalizer serves to reset the month control wheel transfer mechanism, because the No. 2 sub-total key is in normal position when the restoring bar 82 functions.

To illustrate the operation of the machine when the monthly payments do not come out even at the end, let us take the figures used in the example just given, that is, we will use the same purchase price of $2450.00, the same down payment of $500.00, and insurance premium of $15.00 and a carrying charge of $35.00. This leaves an identical balance of $2000.00 to be paid off in monthly payments. The purchaser agrees to pay this balance of $2000.00 in twelve monthly payments, the first eleven payments being $170.00 each and in the final payment he cleans up the balance of $130.00. Such an account is illustrated by the ledger card shown in Fig. 3.

In this example, the operator sets the operation predetermining device for twenty-seven operations to cause the starting bar to be locked after the January balance of $300.00 is printed. The February payment of $170.00 is subtracted from the $300.00 balance and simultaneously printed on the ledger card and the No. 2 totalizer cleared which it will be remembered unlocks the starting bar. The $130.00 balance is then printed by a sub-total operation on the No. 1 totalizer.

The final payment of $130.00 is set up on the keyboard, the non-add key depressed to prevent this amount being added into the No. 2 totalizer the subtract key depressed and the machine released for operation. In this operation the $130.00 payment is subtracted from the No. 1 totalizer and simultaneously printed on the ledger card. A final total printing operation with the No. 1 totalizer prints a single zero in the balance column to show that the sum of the monthly payments equals the amount of the note signed by the purchaser.

As stated previously, the ledger cards are prepared in advance and credit is given the purchaser when he makes a monthly payment by stamping the date the payment is made opposite the payment then due in the column headed "Date Paid."

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

I claim:

1. In a calculating machine the combination with a totalizer, and means to release the machine for operation; of a member to lock the releasing means, said member being normally in ineffective position; an adjustable element adapted to be advanced from any set position back to a neutral position to predetermine the number of machine operations; means including a rockable part and a pawl operated thereby to advance the element one step each machine operation toward neutral position; means operated by the element upon return to neutral position to positively shift the locking means to effective position; resilient means to retain the locking means in effective or ineffective position; and manipulative means cooperating with the shifting means to move the locking means to ineffective position.

2. In a machine of the class described, the combination with an operating means and means to control the operating means, of means to predetermine the number of operations of the control means including an element settable from a normal position various extents to predetermine the number of operations of the control means, means operated by the operating means to move the element toward its normal position on each machine operation, a latch for the control means, means operated by said element when it is moved into its normal position for shifting the latch to lock the control means against operation and a detent for retaining the shifting means in operated position independently of the element, and means for operating the shifting means against the action of the detent, to release the latch so that the control means can be operated.

3. In a machine of the class described, the combination of a motor bar, an element adjustable to variably predetermine the number of machine operations, means for advancing said element one increment for each machine operation, a latch for said motor bar, a detent for normally maintaining the latch in ineffective position, means operable by the element to shift the latch to effective position against the action of said detent when said predetermined number of operations have taken place, said detent being also operable to retain the latch in effective position, and means to positively restore the latch to ineffective position against the action of the detent and independently of the element.

4. In a machine of the class described, the combination of a motor bar, a manually settable element variably positionable from a normal position to predetermine the number of operations of the motor bar, means for advancing the element one step toward its normal position during each machine operation, a locking member cooperable with the motor bar to lock it against operation after a predetermined number of machine operations, means operable by the element when it approaches its normal position to shift the locking member to locking position, a plurality of notches on said shifting means, a spring cooperable with said notches to retain the locking member in its locking or unlocking position independently of the position of said element, and a manually operable key to restore the locking member to its unlocking position independently of said element, said element remaining in its normal position until manually set to control another predetermined number of operations.

RAYMOND A. CHRISTIAN.